US012604873B2

(12) United States Patent
Kawamura et al.

(10) Patent No.: US 12,604,873 B2
(45) Date of Patent: Apr. 21, 2026

(54) REEL SEAT GRIP MEMBER, HANDLE MEMBER FOR FISHING ROD, AND FISHING ROD

(71) Applicant: GLOBERIDE, INC., HigashiKurume (JP)

(72) Inventors: Takuji Kawamura, HigashiKurume (JP); Keisuke Nakagawa, HigashiKurume (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/565,206

(22) PCT Filed: Feb. 16, 2022

(86) PCT No.: PCT/JP2022/006069
§ 371 (c)(1),
(2) Date: Nov. 29, 2023

(87) PCT Pub. No.: WO2023/002654
PCT Pub. Date: Jan. 26, 2023

(65) Prior Publication Data
US 2024/0260556 A1 Aug. 8, 2024

(30) Foreign Application Priority Data
Jul. 21, 2021 (JP) ................................. 2021-121061

(51) Int. Cl.
*A01K 87/06* (2006.01)
*A01K 87/08* (2006.01)
(52) U.S. Cl.
CPC .............. *A01K 87/06* (2013.01); *A01K 87/08* (2013.01)

(58) Field of Classification Search
CPC ........ A01K 87/06; A01K 87/08; A01K 87/00; A01K 87/008; A01K 87/009
See application file for complete search history.

(56) References Cited

U.S. PATENT DOCUMENTS

| | | | | |
|---|---|---|---|---|
| 3,372,510 A | * | 3/1968 | Arsenault | .............. A01K 87/08 |
| | | | | 294/58 |
| 3,410,017 A | * | 11/1968 | Wilson | ................... A01K 87/08 |
| | | | | 43/22 |

(Continued)

FOREIGN PATENT DOCUMENTS

| | | | | | |
|---|---|---|---|---|---|
| CN | 113994938 A | * | 2/2022 | ............. | A01K 87/06 |
| GB | 189620882 A | * | 9/1897 | ............. | A01K 87/08 |

(Continued)

OTHER PUBLICATIONS

Jun. 16, 2023 International Preliminary Report on Patentability issued in International Patent Application No. PCT/JP2022/006069.

(Continued)

*Primary Examiner* — Katelyn T Truong
(74) *Attorney, Agent, or Firm* — Oliff PLC

(57) ABSTRACT

A reel seat grip member is disposed on a rod body on which a reel leg placing portion on which a reel leg is placed is formed, and extends so as to surround an upper portion and a side portion of a nut portion of at least a moving hood among hoods for fixing the reel leg and so as to surround a part of the rod body in a circumferential direction over a fairing portion.

9 Claims, 5 Drawing Sheets

(56) References Cited

U.S. PATENT DOCUMENTS

| | | | | |
|---|---|---|---|---|
| 3,973,348 | A * | 8/1976 | Shell .................... | A01K 87/085 |
| | | | | D22/142 |
| 4,463,512 | A * | 8/1984 | McCreery .............. | A01K 87/06 |
| | | | | 43/22 |
| 4,644,680 | A * | 2/1987 | Dawson ................. | A01K 87/08 |
| | | | | 43/18.1 R |
| 4,653,215 | A * | 3/1987 | Strader ................. | A01K 87/08 |
| | | | | 43/18.1 R |
| 4,850,130 | A * | 7/1989 | Childre ................. | A01K 87/06 |
| | | | | 43/25 |
| 4,860,483 | A * | 8/1989 | Hlad ...................... | A01K 87/08 |
| | | | | 43/18.1 R |
| 5,632,111 | A * | 5/1997 | Takizawa .............. | A01K 87/06 |
| | | | | 43/22 |
| 9,844,213 | B1 * | 12/2017 | Olsen ...................... | B25G 3/20 |
| 10,791,723 | B2 * | 10/2020 | Kuo-Hsuan ............ | A01K 87/06 |
| 11,991,998 | B2 * | 5/2024 | Iwabuchi ............... | A01K 87/08 |
| 2002/0017050 | A1 * | 2/2002 | Irrgang .................. | A01K 87/08 |
| | | | | 43/18.1 R |
| 2018/0020649 | A1 * | 1/2018 | Kotarsky ............... | A01K 87/08 |
| | | | | 43/23 |
| 2019/0166816 | A1 * | 6/2019 | Iwata ..................... | A01K 87/08 |
| 2022/0394966 | A1 * | 12/2022 | Climer ............. | A01K 89/01925 |

FOREIGN PATENT DOCUMENTS

| | | | |
|---|---|---|---|
| JP | S60-116863 | U | 8/1985 |
| JP | H11-137132 | A | 5/1999 |
| JP | 2002-204638 | A | 7/2002 |
| JP | 2004-222655 | A | 8/2004 |
| JP | 2006-187241 | A | 7/2006 |
| JP | 2013-021923 | A | 2/2013 |
| KR | 200166810 | Y1 * | 2/2000 |
| KR | 101899833 | B1 * | 9/2018 |

OTHER PUBLICATIONS

Jan. 7, 2025 Office Action issued in Japanese Patent Application No. 2021-121061.
Oct. 8, 2024 Office Action issued in Japanese Patent Application No. 2021-121061.
May 17, 2022 International Search Report issued in International Patent Application No. PCT/JP2022/006069.
Jan. 28, 2025 Office Action issued in Australian Application No. 2022315650.
May 29, 2025 Office Action issued in United Kingdom Application No. 2400073.9.
Jun. 5, 2025 Office Action issued in Australian Application No. 2022315650.
Jul. 26, 2025 Office Action issued in Chinese Patent Application No. 202280050248.1.
Aug. 26, 2025 Examination Report issued in Australian Application No. 2022315650.
Dec. 22, 2025 Examination Report issued in Australian Application No. 2022315650.
Dec. 26, 2025 Notice of Preliminary Rejection issued in Korean Patent Aplication No. 10-2024-7003721.
Feb. 25, 2026 Office Action issued in British Patent Application No. GB2400073.9.

* cited by examiner

REEL SEAT GRIP MEMBER, HANDLE MEMBER FOR FISHING ROD, AND FISHING ROD

TECHNICAL FIELD

Cross Reference

The present application claims priority based on Japanese Patent Application No. 2021-121061 (filed on Jul. 21, 2021), the contents of which are incorporated herein by reference in their entirety.

The present invention relates to a reel seat grip member, a fishing rod handle member, and a fishing rod comprising any one of these members.

BACKGROUND ART

Conventionally, various fishing rods each including a fishing rod reel seat and a grip have been known.

In such a fishing rod, a fishing rod reel seat and a fishing rod grip are usually placed on a rod body, and a reel leg placing portion for placing a reel leg on an upper side or a lower side of a main body is formed on the fishing rod reel seat.

As such a fishing rod, for example, Patent Literature 1 discloses a fishing rod including: a rod body; a cylindrical reinforcing resin layer formed on a circumferential surface of the rod body and having an uneven surface formed on an outer periphery thereof; and a reel seat injection-molded on an outer circumferential surface of the reinforcing resin layer.

In addition, Patent Literature 2 discloses a fishing rod including a rear grip portion on a rear side of a reel seat including a cylindrical reel seat main body having a reel leg placing portion on which a leg portion of a reel is placed, the fishing rod including: a rod main body; and a rear grip rod body in which a rear grip portion is integrally formed by increasing the diameter of a rear portion of a hollow rod body at a diameter change rate larger than a diameter change rate of the rod main body at the time of forming the hollow rod body from a prepreg, in which a rear portion of the rod main body and a front portion of the rear grip rod body are overlapped and joined integrally with each other inside and outside so as to form an overlapping portion having a predetermined length, and at least a part of the overlapping portion is located inside the reel seat main body.

CITATION LIST

Patent Literature

Patent Literature 1: JP H11-137132 A
Patent Literature 2: JP 2013-21923 A

SUMMARY OF INVENTION

Technical Problem

However, in the fishing rod disclosed in Patent Literature 1, when the fishing rod is operated, the fishing rod is gripped such that a hand of an angler comes into contact with a nut portion of a moving hood. Therefore, the nut portion easily loosens, and there is a problem that operation of tightening the nut portion is required each time. In addition, since the solid reel seat injection-molded on an outer peripheral surface of a cylindrical reinforcing resin layer is disposed on the reinforcing resin layer in the rod body, there is a problem that the weight increases and the size is huge.

In addition, also in the fishing rod disclosed in Patent Literature 2, when the fishing rod is operated, the fishing rod is gripped such that a hand of an angler comes into contact with a nut portion of a moving hood. Therefore, the nut portion easily loosens, and there is a problem that operation of tightening the nut portion is required each time. In addition, since the rear grip rod body and the reel seat main body are joined to the rod main body, there is a problem that an increase in weight for bonding is unavoidable.

The present invention has been made in view of the above circumstances, and an object of the present invention is to provide a reel seat grip member, a fishing rod handle member, and a fishing rod comprising any one of these members, which reduce contact of a hand of an angler with a nut portion of a moving hood during operation of the fishing rod to make the nut portion less likely to loosen, are lightweight, and contribute to compactness of a hood. Other objects of the present invention will become apparent by referring to the entire present specification.

Solution to Problem

A reel seat grip member according to an embodiment of the present invention is disposed on a rod body, and is configured to extend so as to surround an upper portion and a side portion of a nut portion of at least a moving hood among hoods for fixing a reel leg and so as to surround a part of the rod body in a circumferential direction over a fairing portion.

A reel seat grip member according to an embodiment of the present invention is configured to surround the nut portion of the moving hood in a range of 50% to 80% in a circumferential direction of the nut portion.

A reel seat grip member according to an embodiment of the present invention is configured to extend so as to surround the rod body in a range of 20% to 80% in a circumferential direction over the fairing portion.

A reel seat grip member according to an embodiment of the present invention is formed of carbon fiber-reinforced plastic.

In a reel seat grip member according to an embodiment of the present invention, one end of the reel seat grip member is fixed to the hood or the rod body.

In a reel seat grip member according to an embodiment of the present invention, the reel seat grip member has a length of 100 to 400 mm.

In a reel seat grip member according to an embodiment of the present invention, one or a plurality of cut-out portions are formed in a part of the reel seat grip member.

In a reel seat grip member according to an embodiment of the present invention, one or a plurality of honeycomb structures are formed in a part of the reel seat grip member.

A reel seat grip member according to an embodiment of the present invention surrounds a lower portion of a fixing hood among hoods for fixing the reel leg when viewed in a circumferential direction.

A fishing rod according to an embodiment of the present invention is configured to comprise a rod body, a hood disposed on the rod body for fixing a reel leg, and any one of the reel seat grip members described above. In addition, in a fishing rod according to an embodiment of the present invention, a reel seat main body on which a reel leg is placed is disposed on the rod body or the hood.

A fishing rod handle member according to an embodiment of the present invention is disposed on a rod body on which a reel leg placing portion on which a reel leg is placed is formed, and is configured to extend so as to surround an upper portion and a side portion of a nut portion of at least a moving hood among hoods for fixing the reel leg and so as to surround a part of the rod body in a circumferential direction over a fairing portion, a joining portion, and a fishing rod grip portion.

Advantageous Effects of Invention

According to the above embodiments, it is possible to provide a reel seat grip member, a fishing rod handle member, and a fishing rod comprising any one of these members, which reduce contact of a hand of an angler with a nut portion of a moving hood during operation of the fishing rod to make the nut portion less likely to loosen, are lightweight, and contribute to compactness of a hood.

DESCRIPTION OF EMBODIMENTS

Figure 1:
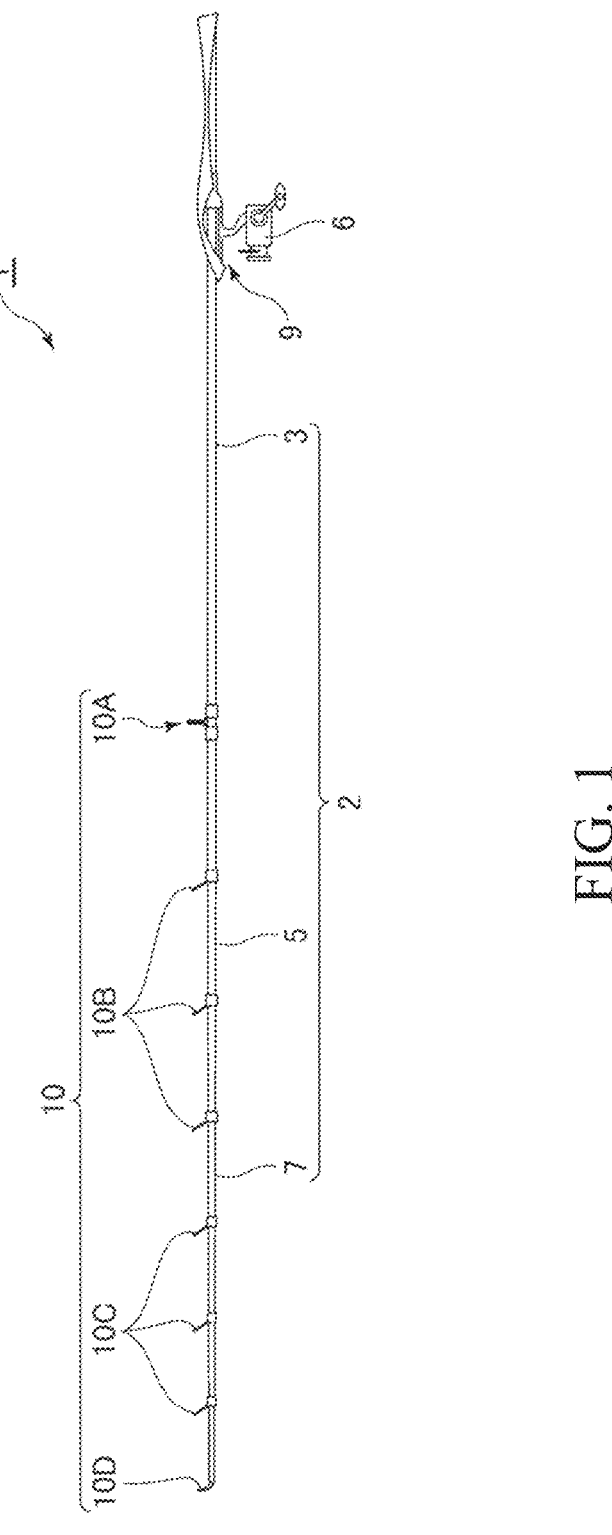
FIG. 1 is a view illustrating a fishing rod according to an embodiment of the present invention.

Hereinafter, embodiments of a fishing rod according to the present invention will be specifically described with reference to the attached drawings. Components common in the plurality of drawings are denoted by the same reference numerals throughout the plurality of drawings. It should be noted that each of the drawings is not always illustrated in a precise aspect ratio for the convenience of description.

FIG. 1 is a view illustrating an embodiment of a fishing rod according to the present invention. As illustrated in the drawing, a fishing rod 1 according to the embodiment of the present invention comprises a rod body 2, a reel R attached to the rod body 2 via a reel seat 9, and a fishing line guide 10 attached to the rod body 2. In the illustrated embodiment, the reel seat 9 and the fishing line guide 10 each correspond to an attachment component attached to an outer peripheral surface of the rod body.

The rod body 2 is configured by, for example, connecting a base rod 3, a middle rod 5, a tip rod 7, and the like to each other. These rod bodies are jointed to each other, for example, as an ordinarily jointed type. The base rod 3, the middle rod 5, and the tip rod 7 can be jointed to each other as a telescopic type, an inversely jointed type, a socket-and-spigot jointed type, or any other known joined type. The rod body 2 may be formed of a single rod body.

The base rod 3, the middle rod 5, and the tip rod 7 are each formed of, for example, a tubular body made of a fiber-reinforced resin. This tubular body made of a fiber-reinforced resin is formed by winding a fiber-reinforced resin prepreg (prepreg sheet) in which reinforcing fibers are impregnated with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. Furthermore, an outer surface of the tubular body is appropriately polished. Each of the rod bodies may be formed in a solid state.

In the illustrated embodiment, the base rod 3, the middle rod 5, and the tip rod 7 comprise a plurality of the fishing line guides 10 (fishing line guides 10A to 10D) for guiding a fishing line fed from the reel 6 attached to the reel seat 9. More specifically, the base rod 3 comprises the fishing line guide 10A, the middle rod 5 comprises the fishing line guide 10B, and the tip rod 7 comprises the fishing line guide 10C. The tip rod 7 comprises the top guide 10D at a tip thereof, but details thereof are omitted.

Next, examples of a reel seat main body 12 and the reel seat 9 will be described with reference to FIG. 2. The reel seat main body 12 comprises the reel seat main body 12 having a reel leg placing surface 12a on which a reel leg 6a of the fishing reel 6 is placed in an axial direction thereof. In the illustrated example, the reel seat main body 12 is disposed in a predetermined portion of the rod body 2 without a gap between the reel seat main body 12 and a fixing hood 14 described later and without a gap between the reel seat main body 12 and a moving hood 22 described later in order to support a reel leg, but may be formed with a predetermined length between the reel seat main body 12 and the fixing hood 14 and with a predetermined length between the reel seat main body 12 and the moving hood 22 so as to support a part of the reel leg.

Although not illustrated, the reel seat main body 12 may be formed so as to surround the rod body 2. The reel seat main body 12 can be configured to have a length of 60 to 160 mm, for example, but is not limited thereto. Various forms, dimensions, and shapes other than these are conceivable for the reel seat main body 12, and the reel seat main body 12 is not limited to a specific aspect.

Figure 2:
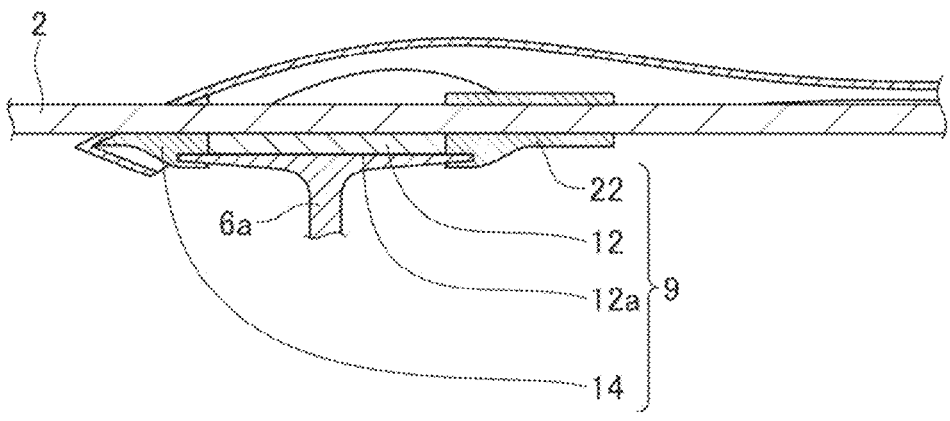
FIG. 2 is a view for describing a fishing rod reel seat according to an embodiment of the present invention.

The reel leg placing surface 12a of the reel seat main body 12 can be formed flat or substantially flat, and the reel seat main body 12 illustrated in FIG. 2 is formed in a state of extending in an axial direction of the rod body 2. In the illustrated example, the fixing hood 14 is disposed at one end (rod tip side) of the reel seat main body 12. One end of the reel leg placing surface 12a of the reel seat main body 12 is disposed inside the fixing hood 14.

The moving hood (also referred to as a floating hood) 22 is attached to the other end (rod base side) of the reel seat main body 12 so as to be movable in an axial direction. A nut portion 23 is disposed in order to move the moving hood 22. The reel seat main body 12, the fixing hood 14, the moving hood 22, and the nut portion 23 may be collectively referred to as the reel seat 9, but details thereof are omitted. As described later, a configuration without the reel seat main body 12 is also conceivable.

Figure 7:
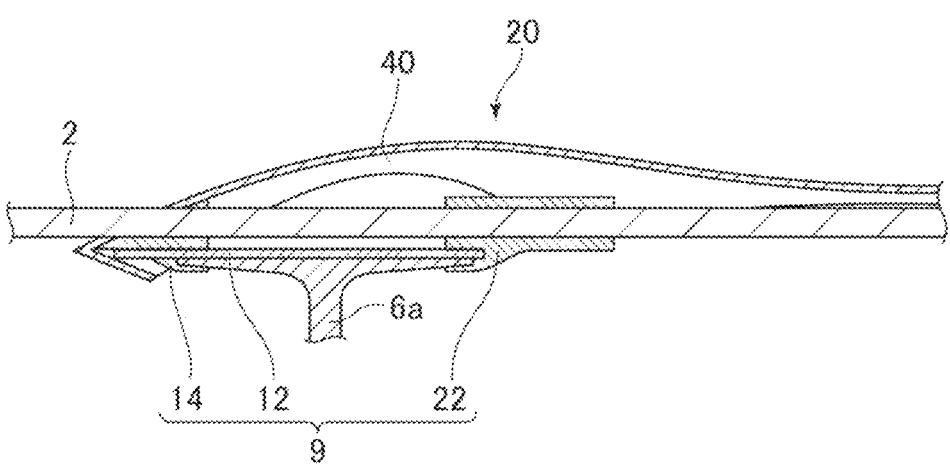
FIG. 7 is a view illustrating a fishing rod handle member according to an embodiment of the present invention.
Figure 8:
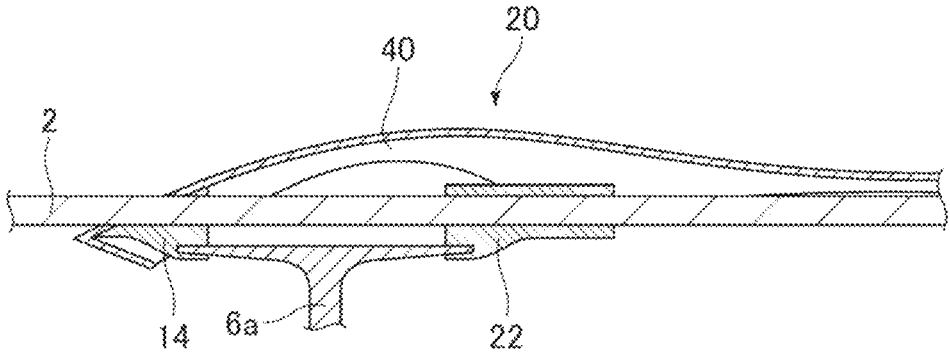
FIG. 8 is a view illustrating a fishing rod handle member according to an embodiment of the present invention.

Here, a fishing rod 1 comprising a reel seat main body 12 according to another aspect will be described with reference to FIGS. 7 and 8. First, in the example illustrated in FIG. 7, the reel seat main body 12 is supported at both ends thereof by the fixing hood 14 and the moving hood 22, and is formed so as to support the reel leg 6a on a placing surface of the reel seat main body. A difference from the aspect illustrated in FIG. 2 is that the reel seat main body 12 supports the rod body 2 in FIG. 2, but the reel seat main body 12 is formed so as not to come into contact with the rod body 2 in FIG. 7. In the example illustrated in FIG. 8, there is no reel seat main body 12, and the reel leg 6a is held at both ends thereof by the fixing hood 14 and the moving hood 22.

Figure 3A:
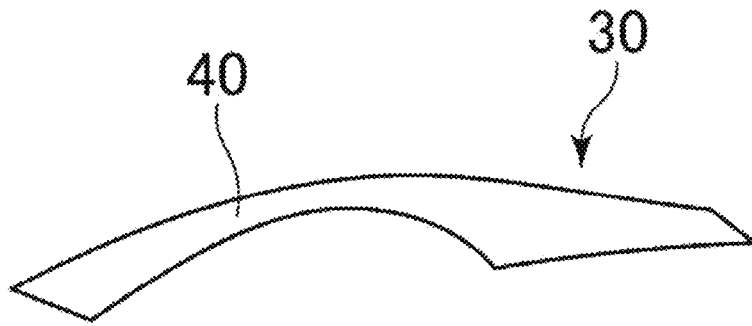
FIG. 3A is a view illustrating a reel seat grip member according to an embodiment of the present invention.
Figure 3B:
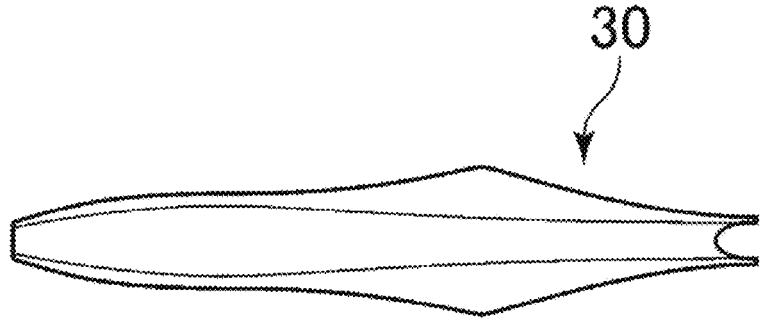
FIG. 3B is a plan view (top view) of a reel seat grip member according to an embodiment of the present invention.
Figure 4A:
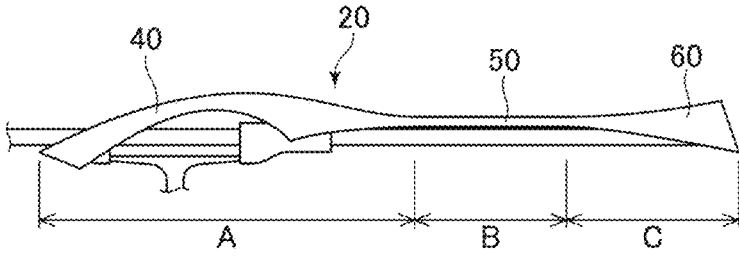
FIG. 4A is a view illustrating a fishing rod handle member according to an embodiment of the present invention.
Figure 4B:
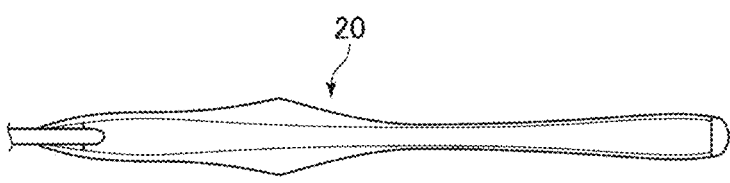
FIG. 4B is a plan view (top view) of a fishing rod handle member according to an embodiment of the present invention.

Next, a reel seat grip member 30 according to an embodiment of the present invention will be described with reference to FIG. 3, and a fishing rod handle member 20 according to an embodiment of the present invention will be described with reference to FIG. 4. (Definition) Here, the fishing rod handle member 20 is a member that comprises a fairing portion 40, a joining portion 50, and a fishing rod grip portion 60 of the fishing rod 1, is configured with A, B, and C illustrated in FIG. 4 as respective ranges, and is intended to impart a grasping property of the fishing rod. In addition, the reel seat grip member 30 corresponds to only the fairing portion 40 of the fishing rod handle member 20 and corresponds to the range A illustrated in FIG. 4, and is a member having a mechanism for attaching a reel and intended to facilitate gripping of the fishing rod. Note that the fairing portion 40 (portion A) means a front (front grip) of the fishing rod handle, the fishing rod grip portion 60 (portion C) means a rear grip of the fishing rod handle, and the joining portion 50 (portion B) is a portion connecting these.

Figure 9:
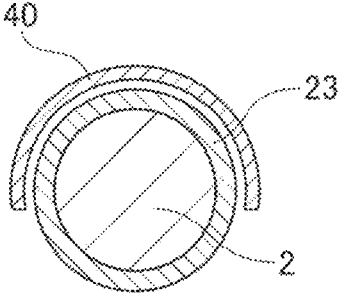
FIG. 9 is a view illustrating a cross section of a reel seat grip member according to an embodiment of the present invention.

As illustrated in FIGS. 2 and 9, the reel seat grip member 30 according to an embodiment of the present invention is disposed on the rod body 2, and is configured to extend so as to surround at least an upper portion and a side portion of the nut portion 23 of the moving hood 22 in the hood 13 for fixing the reel leg 6a and so as to surround a part of the rod body in a circumferential direction over a fairing portion.

According to the reel seat grip member 30 according to an embodiment of the present invention, it is possible to provide a reel seat grip member which reduces contact of a hand of an angler with a nut portion of a moving hood during operation of a fishing rod to make the nut portion less likely to loosen, is lightweight, and contributes to compactness of a hood.

Here, in the fishing rod 1 having the reel seat grip member 30 according to an embodiment of the present invention, the reel seat main body 12 on which the reel leg 6a is placed may be formed on the rod body 2. In addition in the fishing rod 1 having the reel seat grip member 30 according to an embodiment of the present invention, the reel seat main body 12 on which the reel leg 6a is placed may be disposed between the fixing hood 14 and the moving hood 22 of the hood 13, and the reel seat main body 12 and the hood 13 may be integrally formed.

As illustrated in FIG. 9, the reel seat grip member 30 according to an embodiment of the present invention is configured to surround the nut portion 23 of the moving hood in a range of 50% to 80% in a circumferential direction (A) of the nut portion 23. In this way, the reel seat grip member can reduce contact of a hand of an angler with the nut portion of the moving hood during operation of the fishing rod to make the nut portion less likely to loosen. It has been found that such a numerical range is required not only in terms of easiness of gripping of the grip portion but also in order to cover the nut portion of the moving hood for tightening (fixing) the reel leg portion such that a hand or a finger does not touch the nut portion when the grip portion is gripped. It has been found that particularly when 50% or more of the nut portion in a circumferential direction (A) is covered with the grip portion at the time of gripping the grip portion with a hand, the grip portion has a high effect of preventing a gripping finger from touching the nut portion of the moving hood. Note that the same applies to the fishing rod handle member 20 according to an embodiment of the present invention.

The reel seat grip member 30 according to an embodiment of the present invention is configured to extend so as to surround the rod body in a range of 20% to 80% in a circumferential direction (B) over the fairing portion. With such a reel seat grip member, it is possible to significantly reduce the weight as compared with a conventional one while ensuring required minimum rigidity. Note that the same applies to the fishing rod handle member 20 according to an embodiment of the present invention.

The reel seat grip member 30 according to an embodiment of the present invention is formed of carbon fiber-reinforced plastic (CFRP). As a material of the reel seat grip member 30, CFRTP (continuous fiber), CFRTP (discontinuous fiber), or a hybrid may be used. By the reel seat grip member 30 being formed of such a material, it is possible to suppress an increase in weight while ensuring sufficient rigidity and strength as the reel seat grip member 30 used for a fishing rod.

In the reel seat grip member 30 according to an embodiment of the present invention, one end of the reel seat grip member 30 is fixed to the hood or the rod body. Note that the same applies to the fishing rod handle member 20 according to an embodiment of the present invention.

In the reel seat grip member 30 according to an embodiment of the present invention, the reel seat grip member 30 has a length of 100 to 400 mm.

In the reel seat grip member 30 according to an embodiment of the present invention, one or a plurality of cut-out portions are formed in a part of the reel seat grip member 30. Note that the same applies to the fishing rod handle member 20 according to an embodiment of the present invention.

In the reel seat grip member 30 according to an embodiment of the present invention, one or a plurality of honeycomb structures are formed in a part of the reel seat grip member 30. Note that the same applies to the fishing rod handle member 20 according to an embodiment of the present invention.

The reel seat grip member 30 according to an embodiment of the present invention surrounds a lower portion of a fixing hood among hoods for fixing the reel leg when viewed in a circumferential direction. Note that the same applies to the fishing rod handle member 20 according to an embodiment of the present invention.

The fishing rod 1 according to an embodiment of the present invention is configured to comprise the rod body 2, a hood disposed on the rod body 2 for fixing a reel leg, and any one of the reel seat grip members 30 described above. In addition, the fishing rod 1 according to an embodiment of the present invention is configured to comprise the rod body 2, a hood disposed on the rod body 2 for fixing a reel leg, and any one of the fishing rod handle members 20 described above or below.

According to the fishing rod 1 according to an embodiment of the present invention, it is possible to provide a fishing rod which reduces contact of a hand of an angler with a nut portion of a moving hood during operation of the fishing rod to make the nut portion less likely to loosen, is lightweight, and contributes to compactness of a hood.

Next, the fishing rod handle member 20 according to an embodiment of the present invention will be described with reference to FIG. 4. As illustrated in the drawing, the fishing rod handle member 20 according to an embodiment of the present invention is disposed on the rod body 2, and is configured to extend so as to surround at least an upper portion and a side portion of the nut portion 23 of the moving hood 14 in the hood 13 for fixing the reel leg 6a and so as to surround a part of the rod body in a circumferential direction over the fairing portion 40, the joining portion 50, and the fishing rod grip portion 60.

According to the fishing rod handle member 20 according to an embodiment of the present invention, it is possible to provide a fishing rod handle member which reduces contact of a hand of an angler with a nut portion of a moving hood during operation of a fishing rod to make the nut portion less likely to loosen, is lightweight, and contributes to compactness of a hood.

The fishing rod handle member 20 according to an embodiment of the present invention is formed of carbon fiber-reinforced plastic (CFRP). As a material of the fishing rod handle member 20, CFRTP (continuous fiber), CFRTP (discontinuous fiber), or a hybrid may be used. By the fishing rod handle member 20 being formed of such a material, it is possible to suppress an increase in weight while ensuring sufficient rigidity and strength of the handle member 20 used for a fishing rod.

Figure 5A:
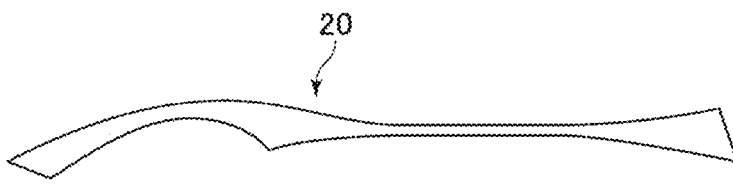
FIG. 5A is a view illustrating a fishing rod handle member according to an embodiment of the present invention.
Figure 5B:
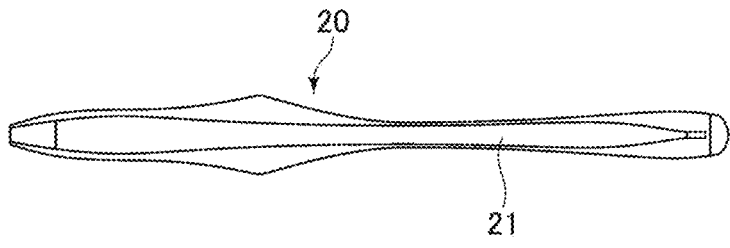
FIG. 5B is a plan view (top view) of a fishing rod handle member according to an embodiment of the present invention.

Next, a fishing rod handle member 20 according to another embodiment of the present invention will be described with reference to FIGS. 5 and 6. First, as illustrated in FIG. 5, a fishing rod handle member 20 according to another embodiment of the present invention is disposed on a rod body 2, is configured to extend so as to surround at least an upper portion and a side portion of a nut portion of a moving hood 14 in a hood 13 for fixing a reel leg 6a and so as to surround a part of the rod body in a circumferential direction over a fairing portion, a joining portion, and a fishing rod grip portion, and has one or a plurality of cut-out portions (one cut-out portion 21 in the illustrated example). As a result, it is possible to provide a fishing rod handle member which reduces contact of a hand of an angler with a nut portion of a moving hood during operation of a fishing rod to make the nut portion less likely to loosen, furthermore, is lightweight, and contributes to compactness of a hood. Note that the same applies to the reel seat grip member 30 according to an embodiment of the present invention.

Figure 6A:
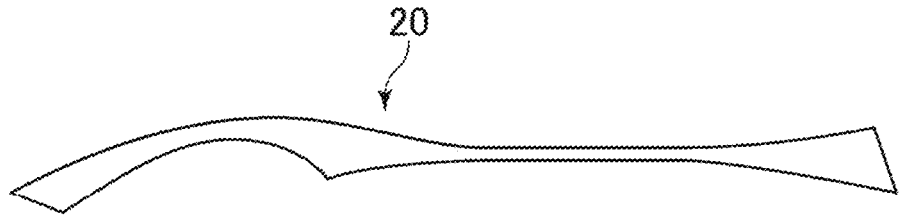
FIG. 6A is a view illustrating a fishing rod handle member according to an embodiment of the present invention.
Figure 6B:
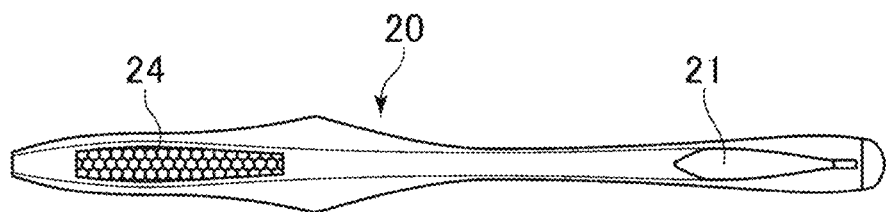
FIG. 6B is a plan view (top view) of a fishing rod handle member according to an embodiment of the present invention.

Next, as illustrated in FIG. 6, a fishing rod handle member 20 according to another embodiment of the present invention is disposed on a rod body 2, is configured to extend so as to surround at least an upper portion and a side portion of a nut portion of a moving hood 14 in a hood 13 for fixing a reel leg 6a and so as to surround a part of the rod body in a circumferential direction over a fairing portion, a joining portion, and a fishing rod grip portion, and has at least either one or a plurality of cut-out portions or one or a plurality of honeycomb structures (one cut-out portion 21 and one honeycomb structure 22 in the illustrated example). As a result, it is possible to provide a fishing rod handle member which reduces contact of a hand of an angler with a nut portion of a moving hood during operation of a fishing rod to make the nut portion less likely to loosen, furthermore, is lightweight, and contributes to compactness of a hood while ensuring required strength. Note that the same applies to the reel seat grip member 30 according to an embodiment of the present invention.

Dimensions, materials, and arrangements of the components described in the present specification are not limited to those explicitly described in the embodiments, and the components can be modified to have any dimensions, materials, and arrangements that may fall within the scope of the present invention. In addition, components not explicitly described in the present specification can be added to the described embodiments, or some of the components described in the embodiments can be omitted.

REFERENCE SIGNS LIST

1 Fishing rod
2 Rod body
3 Base rod
4 Grip
5 Middle rod
6 Reel
6a Reel leg
7 Tip rod
9 Reel seat
10 Fishing line guide
12 Reel seat main body
12a Reel leg placing surface
13 Hood
14 Fixing hood
20 Fishing rod handle member
21 Cut-out portion
22 Moving hood
23 Nut portion
24 Honeycomb structure
30 Reel seat grip member
40 Fairing portion
50 Joining portion
60 Fishing rod grip portion

The invention claimed is:

1. A reel seat grip member configured to be disposed on a rod body, wherein the reel seat grip member is configured to extend to surround an upper portion and a side portion of a nut portion of at least a moving hood of a plurality of hoods for fixing a reel leg and to surround a part of the rod body in a circumferential direction over a fairing portion, the reel seat grip member as a whole is integrally formed of carbon fiber-reinforced plastic, the reel seat grip member is configured to surround the nut portion of the moving hood in a range of 50% to 80% in a circumferential direction of the nut portion, the plurality of hoods includes a fixing hood for fixing the reel leg, the reel seat grip member is configured to circumferentially surround a lower portion of the fixing hood, and the reel seat grip member is configured to be spaced away from the rod body between the moving hood and the fixing hood.

2. The reel seat grip member according to claim 1, wherein the reel seat grip member is configured to surround the rod body in a range of 20% to 80% in a circumferential direction over the fairing portion.

3. The reel seat grip member according to claim 1, wherein one end of the reel seat grip member is fixed to one of the plurality of hoods or the rod body.

4. The reel seat grip member according to claim 1, wherein the reel seat grip member has a length of 100 to 400 mm.

5. The reel seat grip member according to claim 1, wherein a part of the reel seat grip member comprises one or a plurality of cut-out portions.

6. The reel seat grip member according to claim 1, wherein a part of the reel seat grip member comprises one or a plurality of honeycomb structures.

7. A fishing rod comprising:
the reel seat grip member according to claim 1;
the rod body; and
the plurality of hoods, including the moving hood, on the rod body for fixing the reel leg.

8. The fishing rod according to claim 7, wherein a reel seat main body on which a reel leg is placed is on the rod body or one of the plurality of hoods.

9. A fishing rod handle member configured to be disposed on a rod body, wherein the fishing rod handle member is configured to extend to surround an upper portion and a side portion of a nut portion of at least a moving hood among a plurality of hoods for fixing a reel leg and to surround a part of the rod body in a circumferential direction over a fairing portion, a joining portion, and a fishing rod grip portion, the fishing rod handle member as a whole is integrally formed of carbon fiber-reinforced plastic, the fishing rod handle member is configured to surround the nut portion of the moving hood in a range of 50% to 80% in a circumferential direction of the nut portion, the plurality of hoods includes a fixing hood for fixing the reel leg, the fishing rod handle member is configured to circumferentially surround a lower portion of the fixing hood, the fishing rod handle member is configured to be spaced away from the rod body between the moving hood and the fixing hood, and the fishing rod handle member is configured to additionally surround the rod body at an end away from the fixing hood.

* * * * *